(12) United States Patent
Cheng et al.

(10) Patent No.: US 9,990,320 B2
(45) Date of Patent: Jun. 5, 2018

(54) PLUG CONNECTOR WITH TWO-SECTION SPECIAL TERMINALS

(71) Applicant: FOXCONN INTERCONNECT TECHNOLOGY LIMITED, Grand Cayman (KY)

(72) Inventors: Chih-Pi Cheng, New Taipei (TW); Wen He, Shenzhen (CN); Quan Wang, Shenzhen (CN); Feng Zeng, Shenzhen (CN); Fu-You Yang, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days. days.

(21) Appl. No.: 15/682,493

(22) Filed: Aug. 21, 2017

(65) Prior Publication Data

US 2018/0052792 A1 Feb. 22, 2018

(51) Int. Cl.
| | |
|---|---|
| *H01R 33/00* | (2006.01) |
| *G06F 13/40* | (2006.01) |
| *H01R 31/06* | (2006.01) |
| *H01R 31/00* | (2006.01) |
| *H01R 13/6589* | (2011.01) |
| *H01R 13/6461* | (2011.01) |
| *H01R 13/66* | (2006.01) |
| *H01R 12/50* | (2011.01) |

(52) U.S. Cl.
CPC ..... *G06F 13/4004* (2013.01); *H01R 13/6461* (2013.01); *H01R 13/6589* (2013.01); *H01R 13/6616* (2013.01); *H01R 23/7073* (2013.01); *H01R 31/005* (2013.01); *H01R 31/065* (2013.01)

(58) Field of Classification Search
CPC ... G06F 13/4004; H01R 31/065; H01R 31/05; H01R 13/6589; H01R 13/6461; H01R 13/6616; H01R 23/7073; H01R 23/725
USPC .................................. 439/144, 145, 350, 660
See application file for complete search history.

(56) References Cited

U.S. PATENT DOCUMENTS

| | | | | |
|---|---|---|---|---|
| 8,172,620 B2* | 5/2012 | Su | ........................... | H01R 13/42 439/607.01 |
| 8,814,599 B2* | 8/2014 | Wu | ..................... | H01R 13/5808 439/607.48 |
| 8,821,181 B1* | 9/2014 | Lam | ....................... | H01R 24/60 439/357 |
| 8,894,441 B2* | 11/2014 | Wu | ..................... | H01R 13/6598 439/607.01 |

(Continued)

*Primary Examiner* — Khiem Nguyen
(74) *Attorney, Agent, or Firm* — Wei Te Chung; Ming Chieh Chang

(57) ABSTRACT

A plug connector includes an insulating body defining a mating cavity opening forwardly and a cable-load portion, a row of upper terminals, a row of lower terminals and a special terminal. The special terminal includes a contacting piece and a soldering piece discrete from each other. The contacting piece unitarily includes a contacting portion located at the upper inside of the mating cavity and an upper connecting portion, and the soldering piece unitarily includes a soldering leg exposed upon the lower loading face of the cable-loading portion and a lower connecting portion extending forward from the soldering leg. The upper connecting portion and the lower connecting portion electrically connect to each other so as to establish an electrical connection of the special terminal.

13 Claims, 17 Drawing Sheets

(56) References Cited

U.S. PATENT DOCUMENTS 8,920,197 B2 * 12/2014 Tzviskos ............ H01R 13/405
439/660

* cited by examiner

US 9,990,320 B2

PLUG CONNECTOR WITH TWO-SECTION SPECIAL TERMINALS

BACKGROUND OF THE INVENTION

1. Field of the Invention

The present invention relates to a plug connector, and particularly to a plug connector with two-section special terminals.

2. Description of Related Art

The USB Implementers Forum, Inc., a non-profit corporation has announced a new type of electrical connector, USB Type C connector including a plug connector and a receptacle connector, on Aug. 11, 2014. The plug connector can be both positively and negatively inserted into the corresponding receptacle connector, which has great market potential so that connector manufacturers cooperating with the system vendors are involved in an active development, according to current industry report and news. The USB Type-C plug connector has a full-pin structure which includes four pairs of differential pins transmitting USB 3.1 signals, and a pin-missing structure which doesn't configure or directly removes said four pairs of differential pins from the full-pin structure, but still equips with up to 11 or 12 pins in general resulting that a switching board is added to connect with the cable further causing a high cost.

Hence, a plug connector including an improved structure is necessary.

SUMMARY OF THE INVENTION

Accordingly, an object of the present invention is to provide a plug connector overcoming the aforementioned shortcomings.

To achieve the above object, a plug connector comprises an insulating body defining a mating cavity opening forwardly with an upper inside and a lower inside, a cable-load portion with an upper loading face and a lower loading face; a row of upper terminals unitarily comprising contacting portions arranged along the upper inside of the mating cavity and connecting legs to the upper face of the cable-loading portion; a row of lower terminals unitarily comprising contacting portions arranged along the lower inside of the mating cavity, and connecting legs extending to the lower face of the cable-loading portion; and a special terminal. The special comprises a contacting piece and a soldering piece discrete from each other, the contacting piece unitarily comprises a contacting portion located at the upper inside of the mating cavity and an upper connecting portion, and the soldering piece unitarily comprises a soldering leg exposed upon the lower loading face of the cable-loading portion and a lower connecting portion extending forward from the soldering leg, the upper connecting portion and the lower connecting portion electrically connect to each other so as to establish an electrical connection of the special terminal.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
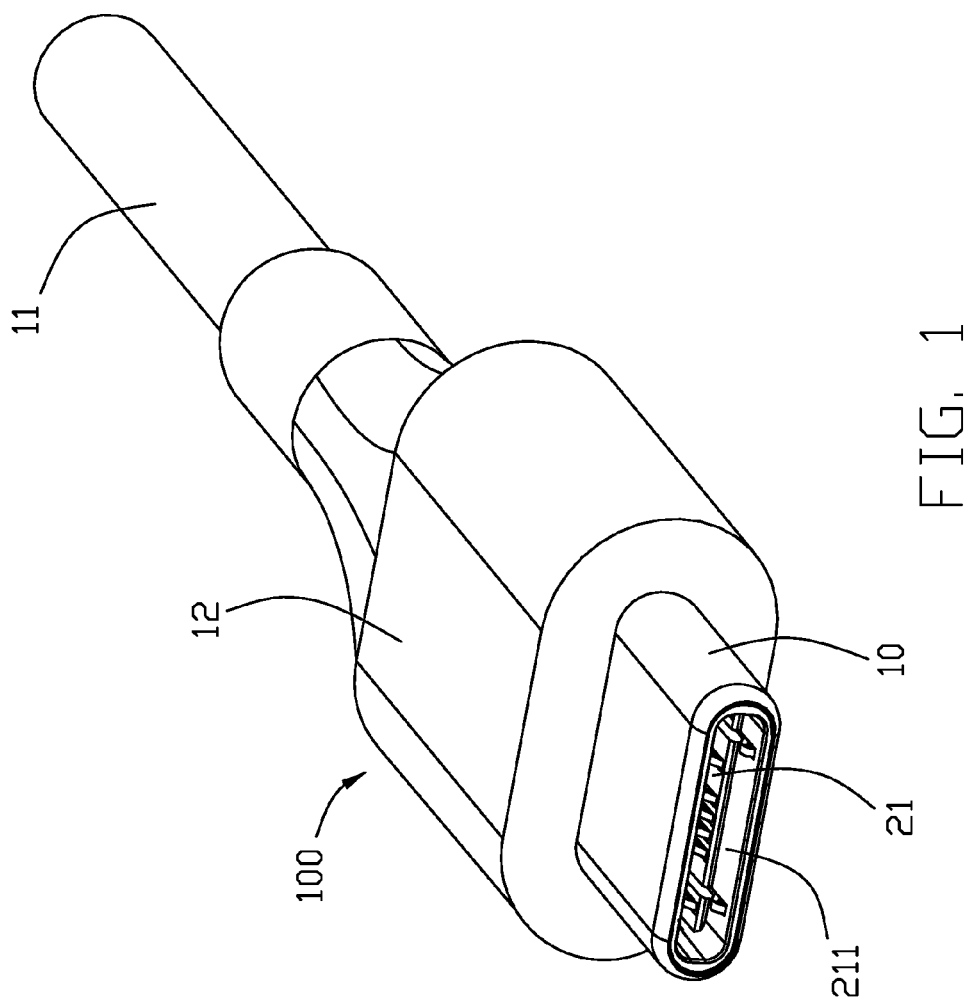
FIG. 1 is a top perspective view of a plug connector according to the preferred embodiment of the invention.
Figure 2:
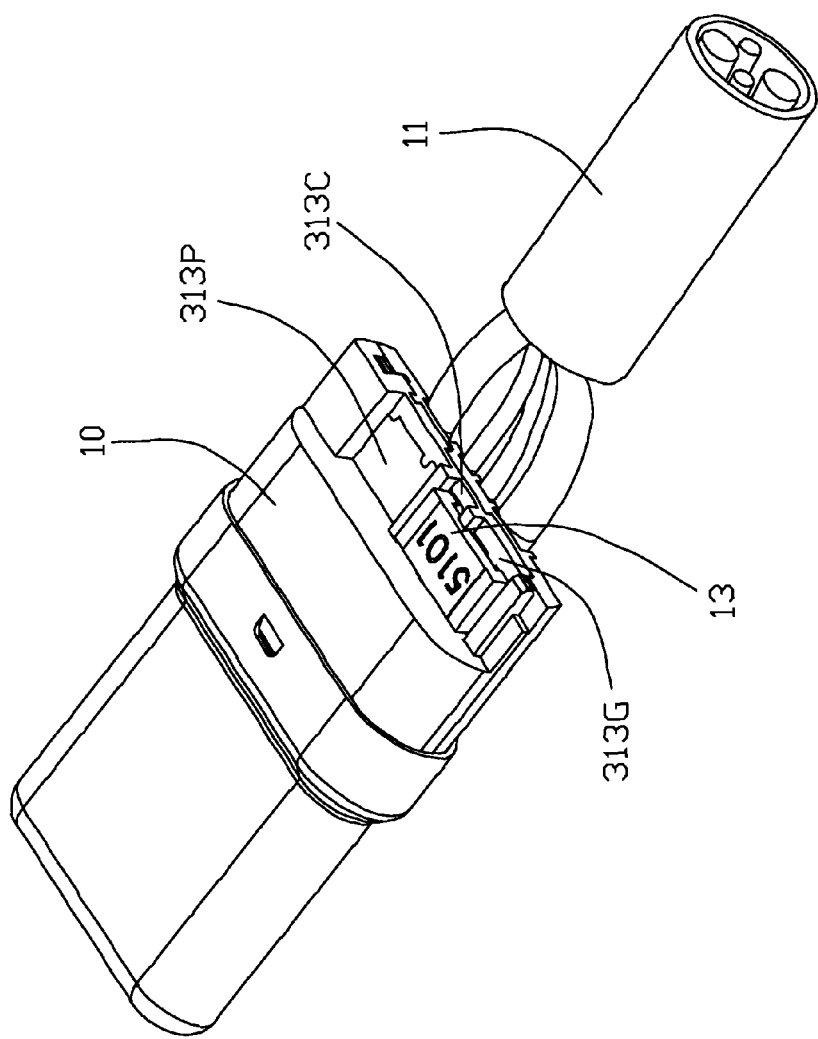
FIG. 2 is a top perspective view of the plug connector shown in FIG. 1, wherein an insulating cover is removed.
Figure 3:
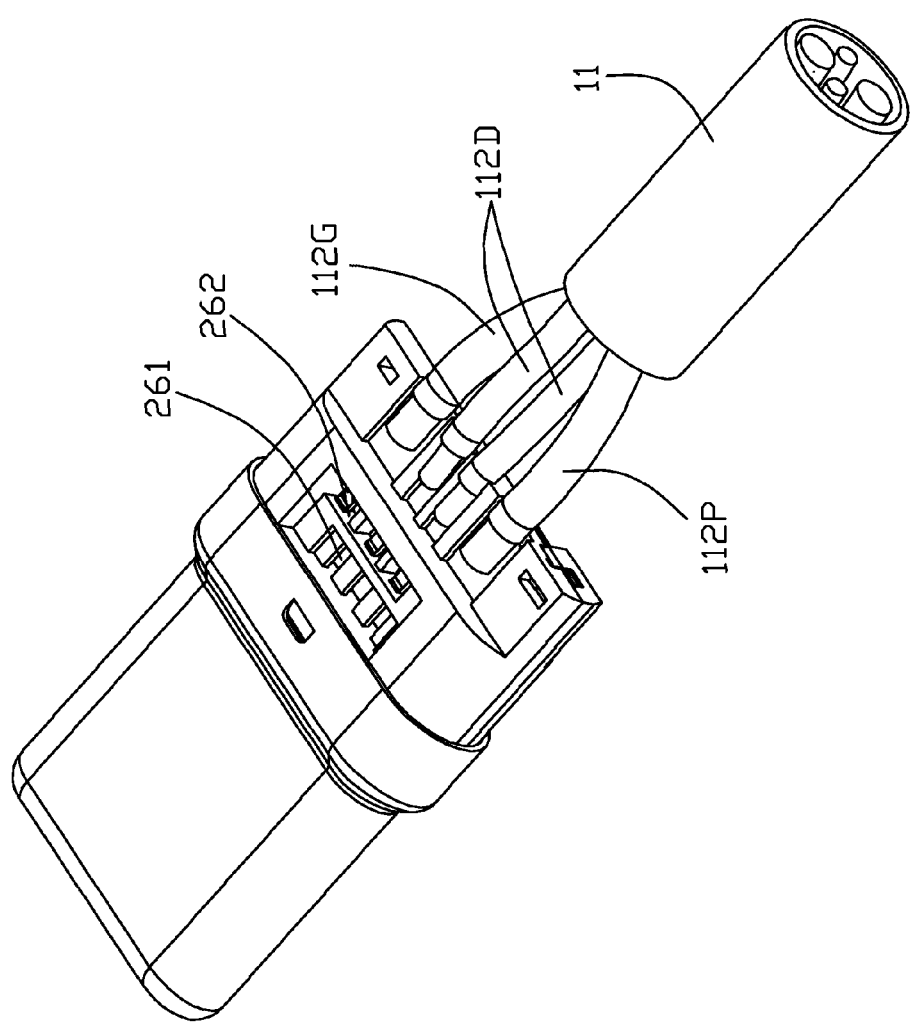
FIG. 3 is a bottom view of the plug connector shown in FIG. 2.

Referring to FIGS. 1 to 3 illustrating a USB Type-C plug connector 100 extending in a front-to-back direction, the plug connector 100 comprises a plug head 10 in the front end thereof, a cable 11 electrically connecting with the plug head 10 at the back end thereof, and an elongate insulating cover 12 surrounding an outer joints of the head 10 and the cable 11. In FIGS. 2 to 3 illustrating how wires of the cable 11 connect with terminals 30 in the plug head 10, the plug head 10 are adapted for connecting with various types of the cable 11 in various applications. In a preferred embodiment as best shown in FIGS. 2 and 3, the cable 11 is equipped with a power wire 112P, a pair of USB 2.0 signal wires 112D and a ground wire 112G respectively connecting with the terminals 30 cooperating with a resistor 13, such that a USB 2.0 Type-C to Micro USB Type-B cable assembly is made. The plug head 10 is described in detail hereinafter.

Figure 4:
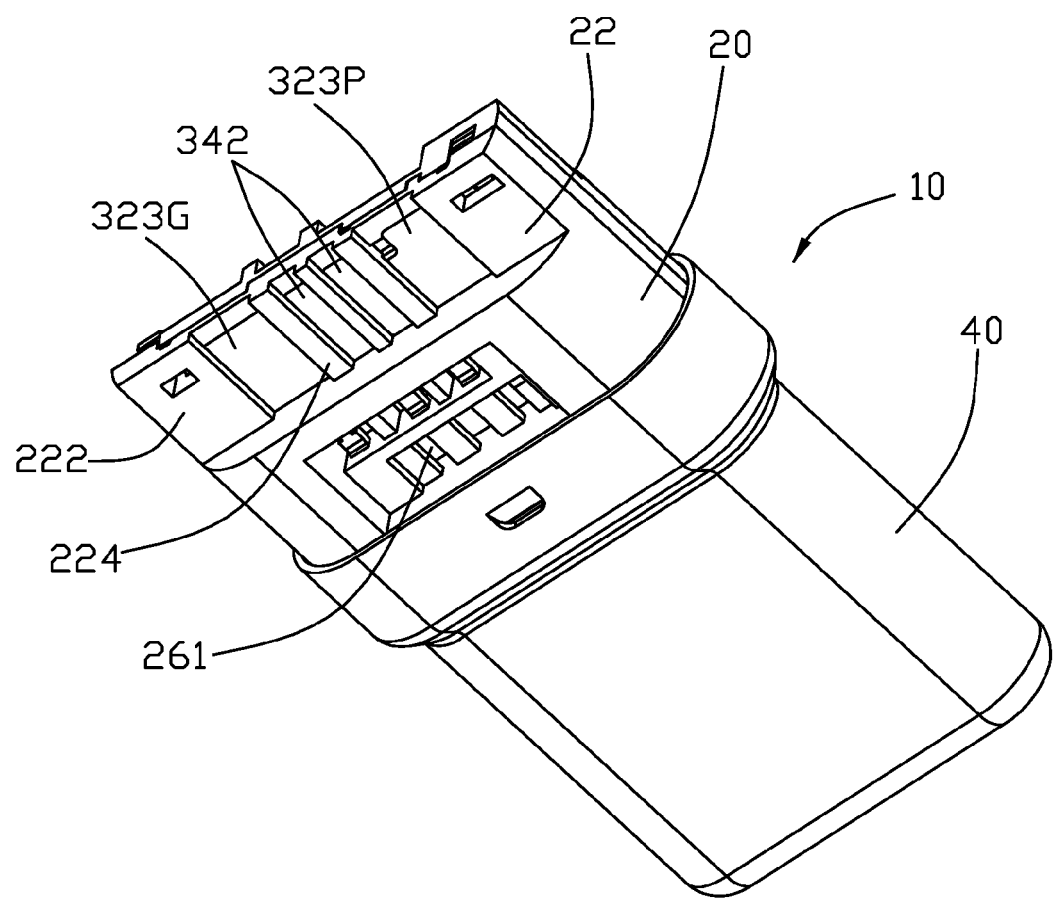
FIG. 4 is a bottom perspective view of the plug head shown in FIG. 3, wherein a cable is removed.
Figure 5:
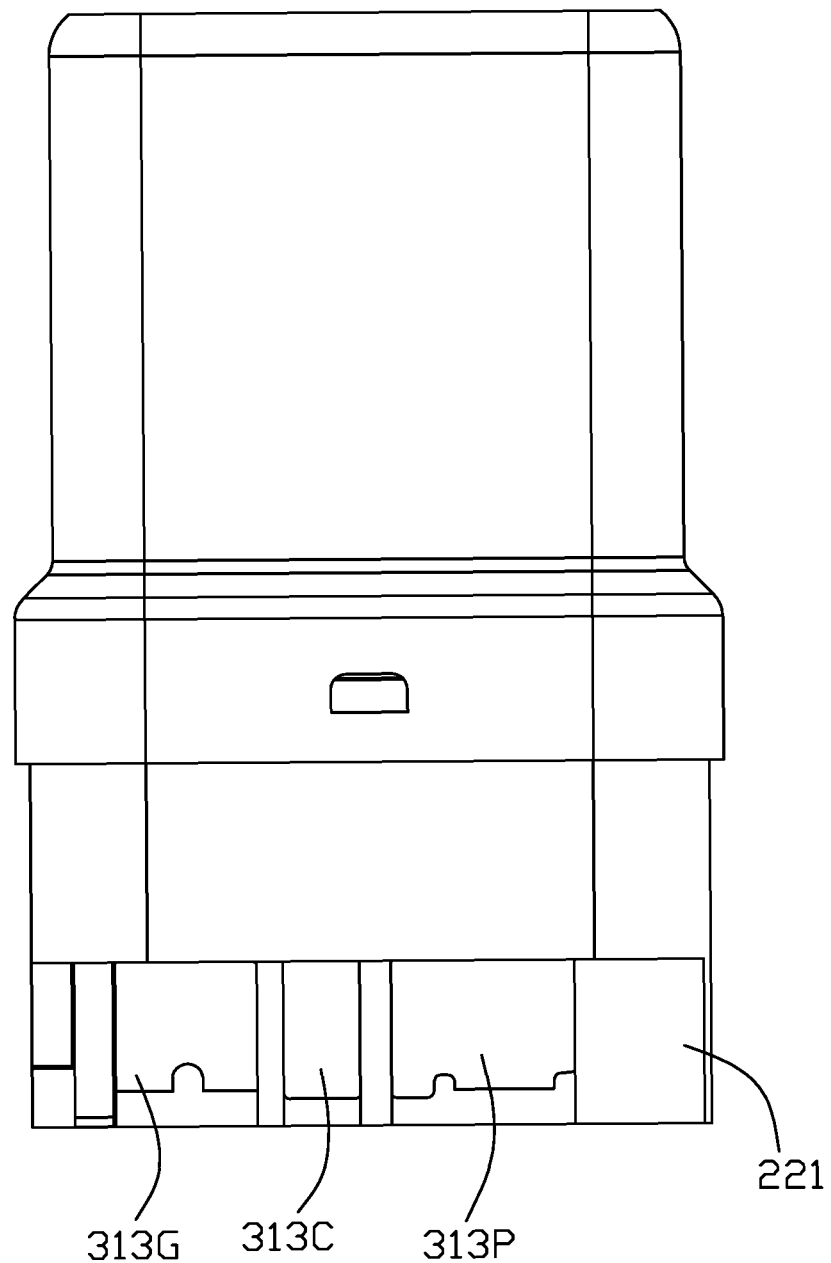
FIG. 5 is a top plane view of the plug connector shown in FIG. 4.
Figure 6:
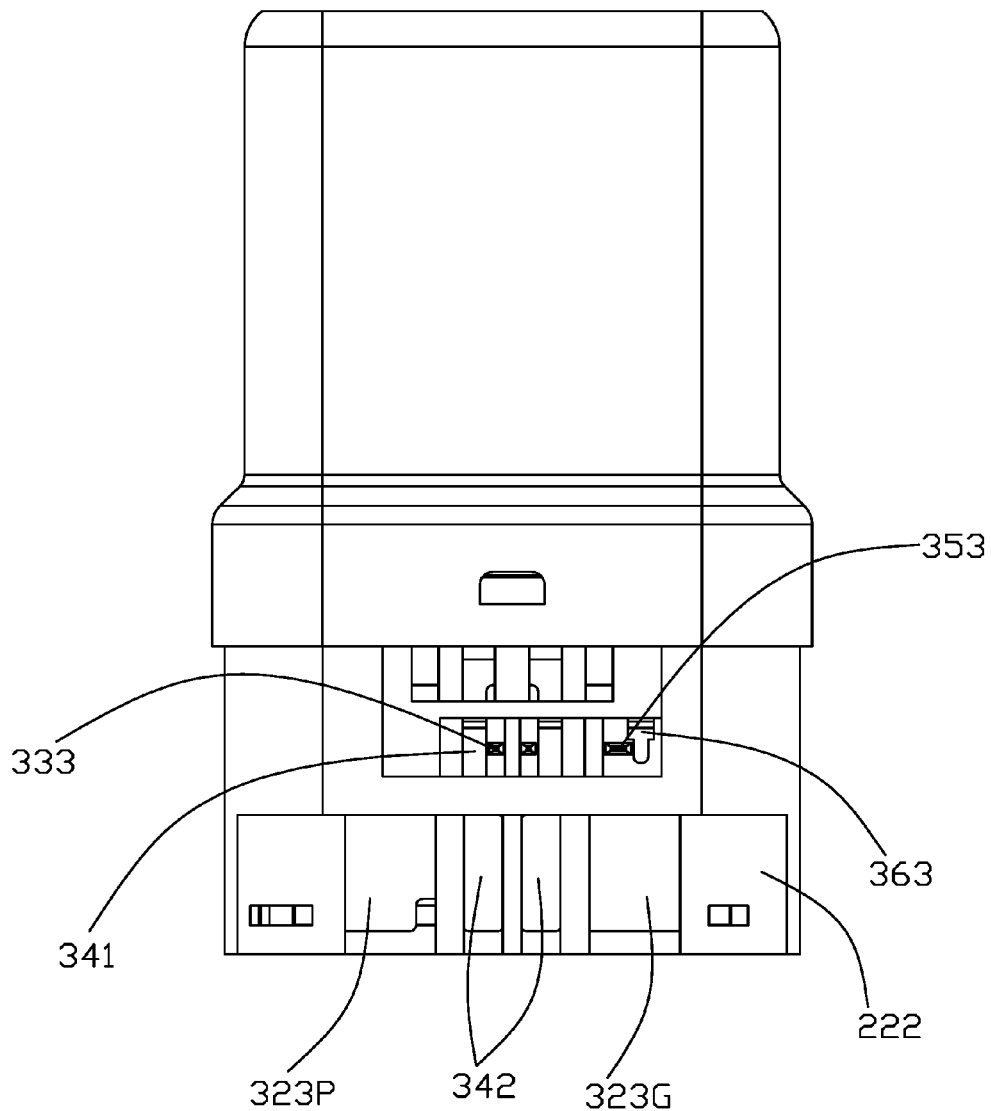
FIG. 6 is a bottom plane view of the plug connector shown in FIG. 5.

Referring to FIG. 4 combination with FIGS. 5-6, the plug head 10 includes an insulating body 20 loaded with the terminals 30, a metallic shell 40 fitly enclosing an outside of the insulating body 20. The insulating body 20 defines a mating cavity 21 (labeled in FIG. 1) opening forward with an upper inside 211 (labeled in FIG. 1) and a lower inside (not labeled) opposite to the upper inside 211, and a cable-loading portion 22 at a rear end thereof with an upper loading face 221 and a lower loading face 222 opposite to each other. The terminals 30 include contacting portions arranged on the upper and lower insides of the mating cavity 21 and soldering legs exposed upon the cable-loading portion 22 for being welded with the wires of the cable. In the preferred embodiment, the plug head 10 can be inserted into a counter connector or receptacle connector positively and negatively, that means the definition of upper and lower is only for simply describing, and the plug head 10 doesn't have absolutely an upper side or a lower side. However, for a conveniently describing aim, a side where the contacting portions of USB 2.0 signal terminal (D+, D-) are disposed, is defined as an upper side, while an opposite side is defined as a lower side.

Figure 7:
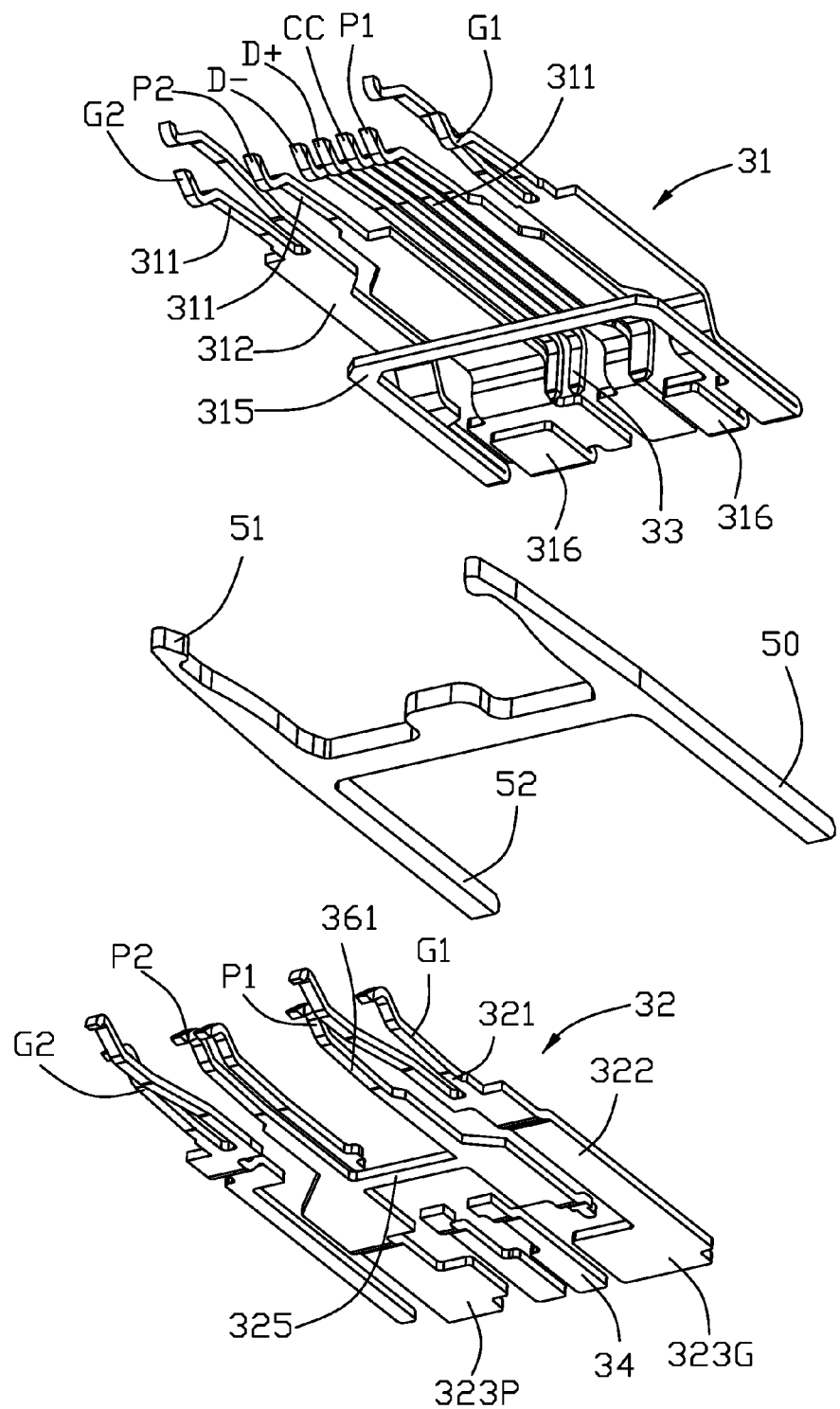
FIG. 7 is a top exploded view of the two rows of terminals and a latching member of the plug connector.
Figure 8:
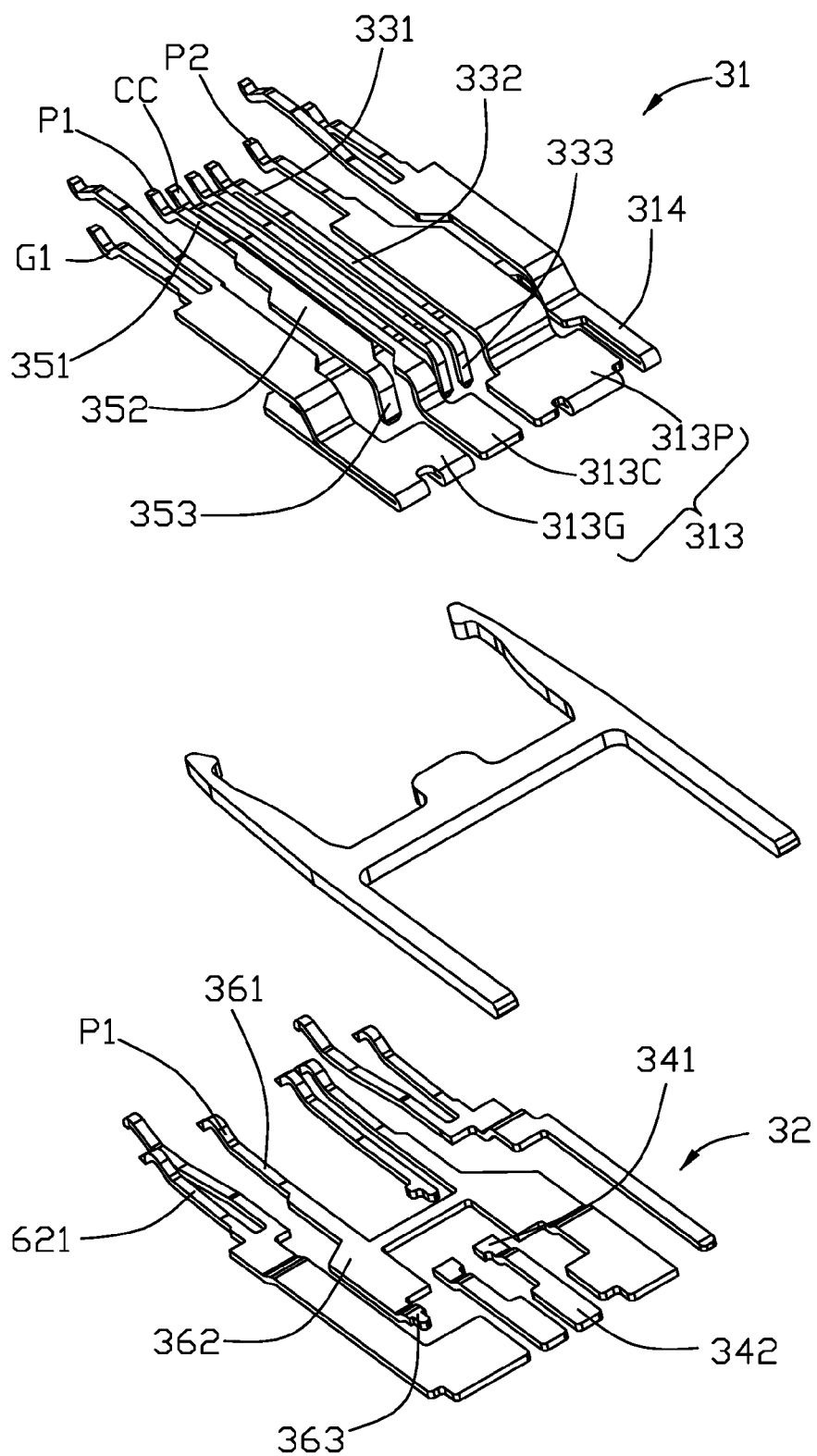
FIG. 8 is a bottom exploded view of the two rows of terminals and the latching member of the plug connector.
Figure 9:
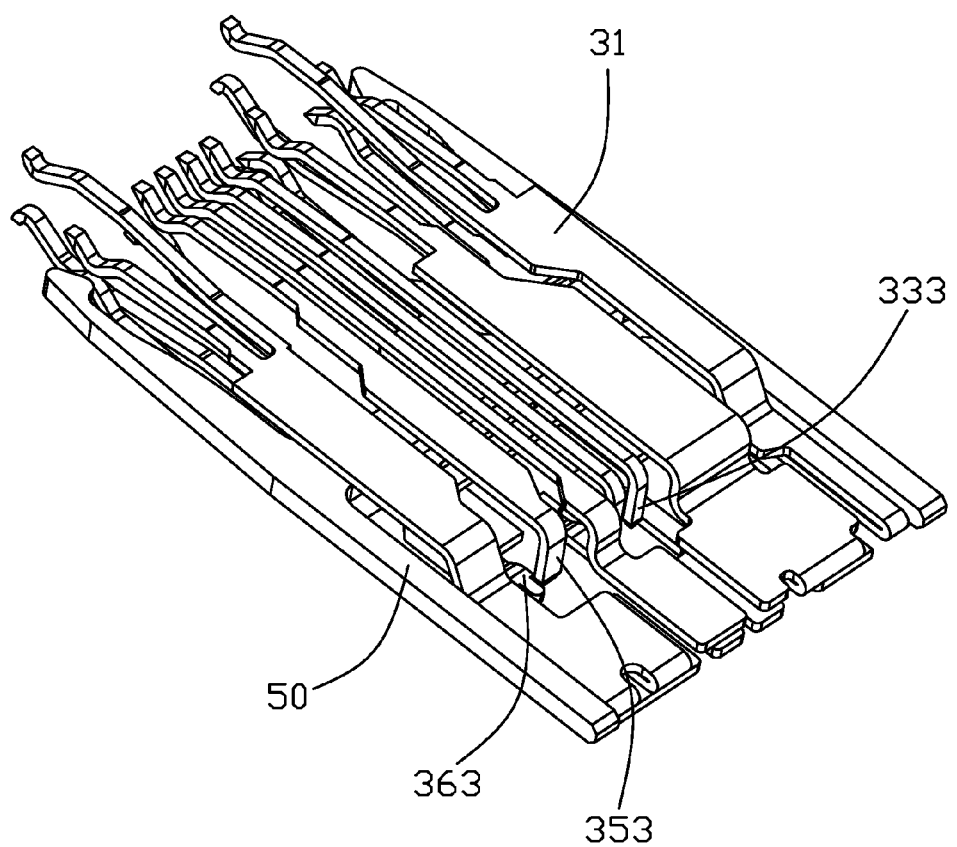
FIG. 9 is a perspective view of the two rows of terminals and the latching member of the plug connector r 7.

Referring to FIGS. 7 to 9, the terminals 30 include a row of upper terminals 31 and a row of lower terminals 32. The row of upper terminals 31 comprises a first ground terminal G1, a first power terminal P1, a detecting terminal CC, a pair of two USB2.0 signal terminals (D+、D-), a second power terminal P2 and a second ground terminal G2 in series. Each of the first ground terminal G1, the detecting terminal CC and the second power terminal P2 includes a contacting portion 311 arranged at the upper inside 211 and a leg portion 313 extending rearward and a retaining portion 312 integrally connecting with the contacting portion 311 and the leg portion 313, the leg portion 313 are exposed upon the upper loading face 211 and ready to connect with the wires of the cable 11 or resistor 13 as shown in FIGS. 2 and 5. Therefore, the leg portions 313 are construed as a first ground soldering leg 313G, a detecting soldering leg 313C, and a first power soldering leg 313G. The second ground terminal G2 comprises a leg portion 314 which is embedded under the upper loading face 221 and do not weld with the wire of the cable. The leg portion 314 is connecting with the ground soldering leg 313G via a U-shaped bridge 315 so that the two upper ground terminals G1, G2 commonly share the grounding soldering leg 313G.

The row of lower terminals 32 are arranged with a first ground terminal G1, a first power terminal P1, a second power terminal P2 and a second ground terminal G2 in series. Each of first ground terminal G1 and the second power terminal P2 includes a contacting portion 321 arranged at the lower side of the mating cavity 21, a leg portion 323 extending backward, and a retaining portion 322 integrally connecting the contacting portion and the leg portion. The two leg portions are exposed upon the lower loading face 222 and ready to be welded with the wires of the cables. Therefore, the leg portions are construed as a second grounding soldering leg 323P, a second power soldering leg 323P. The two power terminals P1, P2 of the lower terminals are connected together by a cross beam 325 so as to share the second power soldering leg 323P. Moreover, a bending portion 316 integrally formed at the second terminal P2 of the upper terminals electrically contacts the second power soldering leg 323P of the lower terminals. In the same way, a bending portion 316 integrally formed at the first ground terminal G1 of the upper terminals electrically contacts the second ground soldering leg 323G. An H-shape metallic latching member 50 sandwiched between the upper terminals 31 and the lower terminals 32, comprises a pair of locking heads 51 and a pair of leg portion 52. Preferably, the upper or lower ground terminals G1, G2 can be configured to abut against the leg portion 52 in a left-to-right direction/traverse direction for a grounding trace.

The row of upper terminals 31 further include three piece of two-step special terminals. In the preferred embodiment, the special terminals consists of three terminals, two signal terminals D+, D- and a first power terminal P1 of the upper terminals. The signal terminal D+ includes a contacting piece 33 and a leg piece 34 independent from each other. The contacting piece 33 includes a contacting portion 331 located at the upper inside 211, a retaining portion 332 extending backward from the contacting portion 331 and a first connecting portion 333 bending from the retaining portion 332 and toward the lower loading face 222. The soldering piece 34 includes a soldering leg 342 and a second connecting portion 341 extending forward from the soldering leg 342. It should be noted that the first connecting portion 333 vertically connect the second connecting portion 341 so as to electrically connect with each other. The other signal terminal D- is constructed in a same way with the signal terminal D+.

The first power terminal P1 of the upper terminals comprises a contacting portion 351 located at the upper inside 211, a retaining portion 352 extending backward from the contacting portion 351 and a first connecting portion 353 bending from the retaining portion 352 and toward the lower loading face 222. The first power terminal P1 of the lower terminals includes a contacting portion 361 located at the lower inside 211, a retaining portion 362 extending backward from the contacting portion 361 and a second connecting portion 363 extending backward from the retaining portion 362 toward the upper loading face 221. It should be noted that the first connecting portion 353 vertically connect the second connecting portion 363 so as to electrically connect with each other. Therefore, the lower loading face 222 are arranged with the first ground soldering leg 323G, a pair of signal soldering legs 342 and the second power soldering leg 323P in series, which is used to weld with the wires of the cable.

Referring to FIGS. 4 to 6, the first ground soldering leg 323G, a pair of signal soldering legs 342 and the second power soldering leg 323P on the lower loading face 222 are spaced from each other by three insulating ribs 224 for a soldering connection with the cable 11. The soldering faces of said soldering legs are under the upper loading face 222. The signal soldering legs 342 are configured to 0.7 mm in width, while the second power soldering leg 323P and the second ground soldering leg 323G are respectively configured to 1.4 mm as shown in FIG. 6. Referring to FIG. 5, the detecting soldering leg 313C, the first power soldering leg 313G and the first ground soldering leg 313G at the upper loading face 221 are respectively configured into 1.0, 2.4, 2.39 mm in width. That is, compared to the prior art, the width of the first ground soldering leg 313G or the first power soldering leg 313P is obviously increased conducive to transmitting large current. Considered an occasion that the plug connector 100 is applied to transmit a power of up to 6.5 or 7 amperes, the cable 11 is required only one said power core wire 112P to solder with the first power soldering leg 313P located at the upper loading face 221, which is different from that the cable is required another power core wire to solder with another power leg 323P located at the lower loading face 222 in the prior art. In other embodiment according to the present invention, it is possible to only configure the first power/ground soldering leg (313P/313G) at the upper loading face 221 into more than 2.0 mm in width. Referring to FIG. 6 again, in the preferred embodiment, the upper connecting portion 333/353 and the corresponding lower connecting portion 341/363 are adjacent to and spaced from each other with a certain distance along the left-to-right direction so that a soldering technology is needed. Of course, in other embodiment, the first connecting portion 333/353 and the corresponding second connecting portion 341/363 can directly press against each other for a mechanical and electrical connection, instead.

Figure 10:
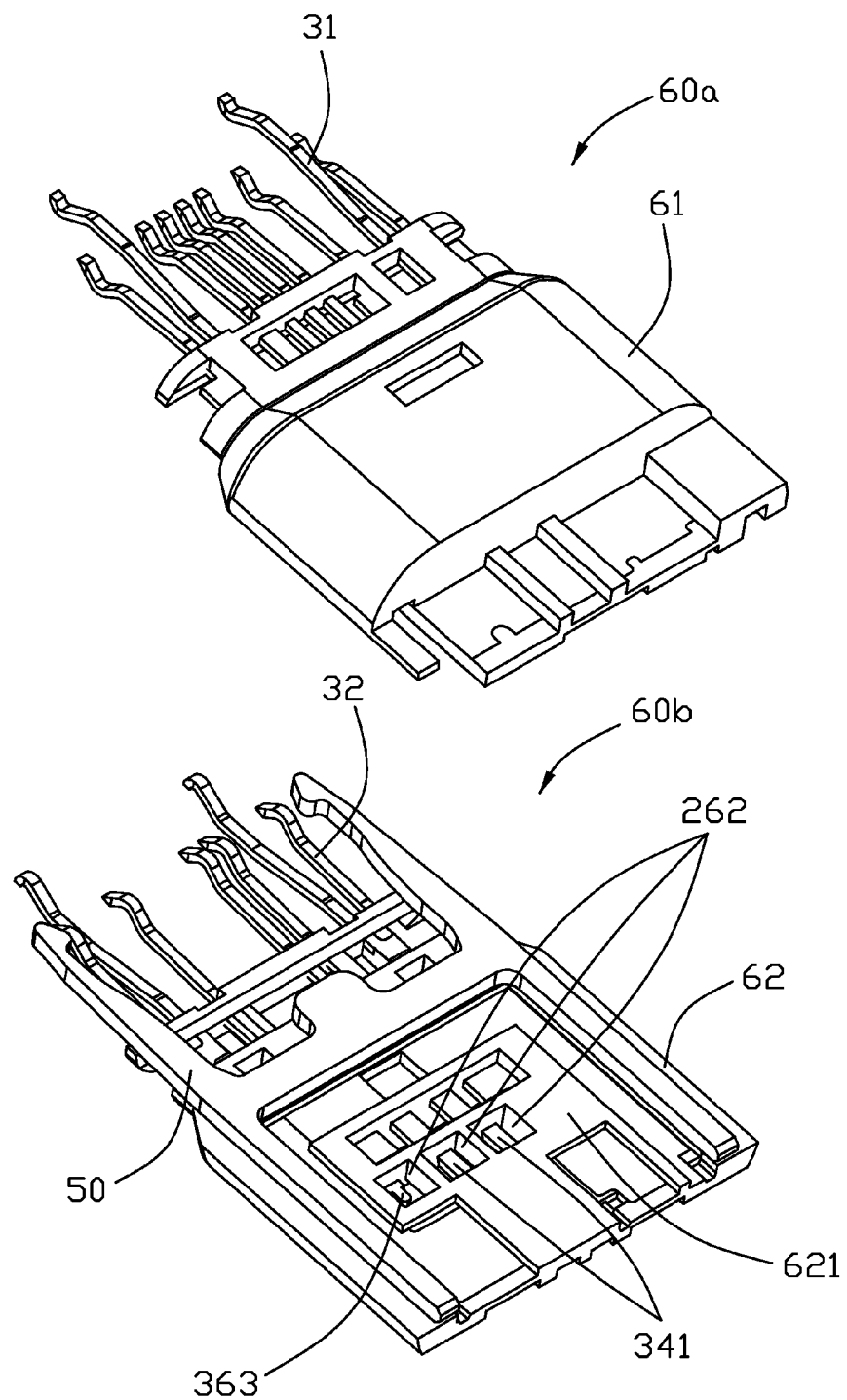
FIG. 10 is a top exploded view of an upper terminal module, a lower terminal module assembled with the latching member.
Figure 11:
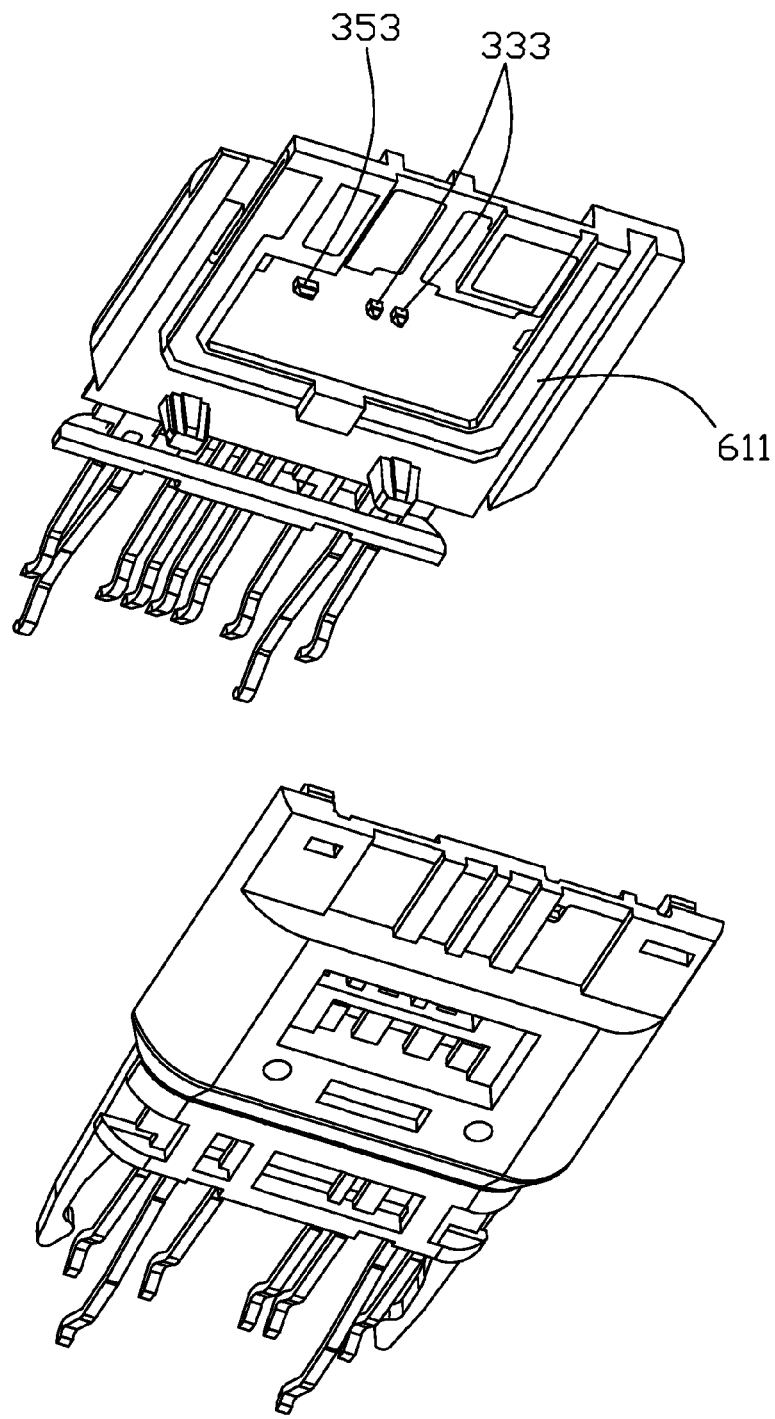
FIG. 11 is another view of FIG. 10.
Figure 12:
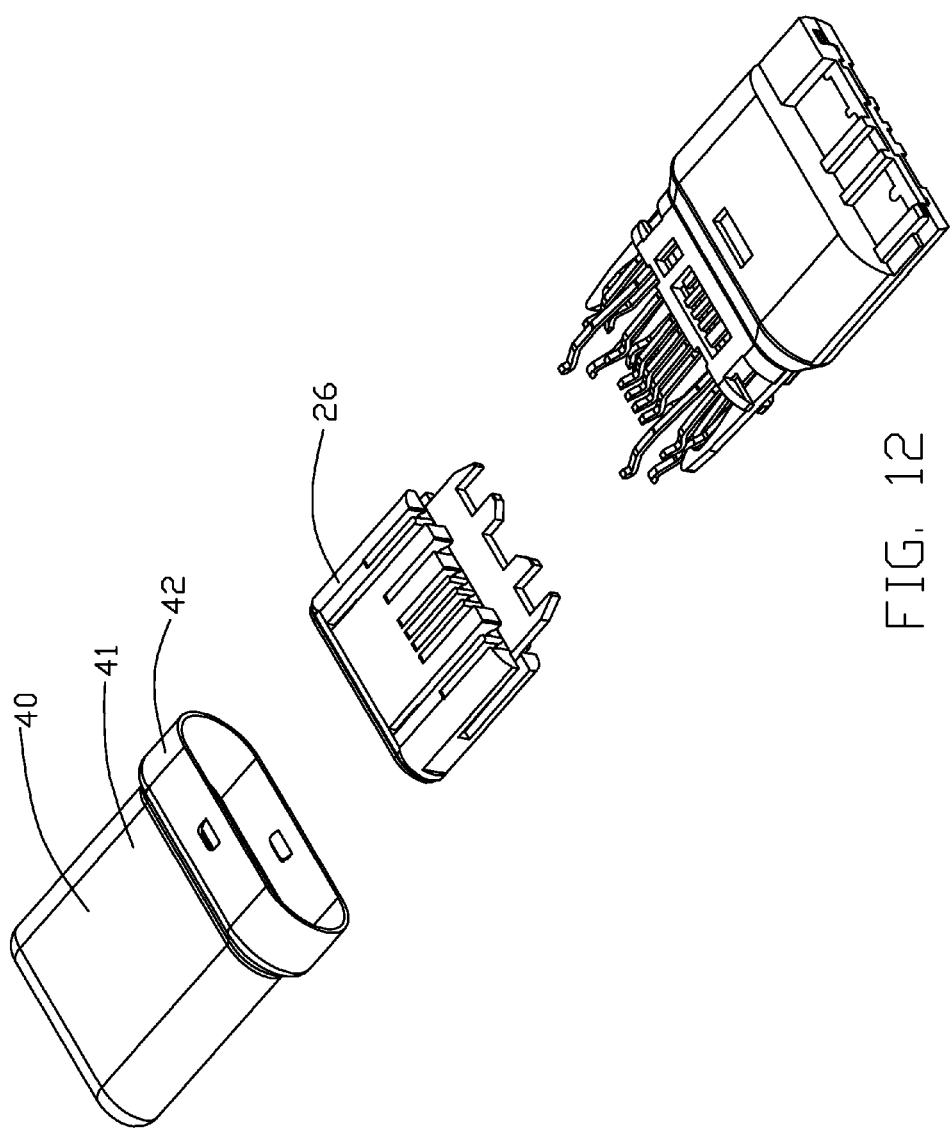
FIG. 12 is an exploded view of the plug head shown in FIG. 4.

Referring to FIGS. 10 to 12, the plug connector 100 comprises an upper terminal module 60a and a lower terminal module 60b stacked upon each other in an upper-to-lower/vertical direction. The upper terminal module 60a includes an upper insulator 61 loaded with the upper terminals 31 and contacting pieces of the special terminals, and the lower terminal module 60b includes a lower insulator 62 loaded with the lower terminals and the soldering pieces 34 of the special terminals retained therein. The insulating body 20 includes an insulating frame 26, the upper insulator 61 and the lower insulator 62, assembled together. The first connecting portions 333, 353 of the special terminals are exposed on a lower face 611 of the upper insulator 61, and the second connecting portions 341, 363 of the special terminals are exposed on an upper face 621 of the lower insulator 62. The lower insulator 62 defines three slots 262 vertically corresponding to the three second connecting portions 341, 363 respectively. After the two terminal modules 60a, 60b and the latching member 50 are assembled together, some solder material are poured into the slots 262 to joint the first connecting portions 333, 353 and the corresponding second connecting portions 341, 363 for an electrical connection, and then an assembly of the two terminal modules 60a, 60b is forwardly inserted into said insulating frame 26 disposed at the front of the plug head 10. The contacting portions of the upper, lower terminals 31, 32 protrude into the mating cavity 21 and are arranged at two inside thereof in the vertical direction, meanwhile the two locking portions 51 oppositely protruding into the mating cavity 21 in the traverse direction. Subsequently, the metallic shell 40 is enclosed around the insulating body 20. The metallic shell 40 includes a front part 41 with a smaller traverse width and a bigger elongate length, and a rear part 42 with a bigger traverse width but a smaller elongate length so as to only cover a front part of the upper and lower insulators 61, 62 (see in FIG. 2) which results from a limited deep-drawing technology.

Figure 13:
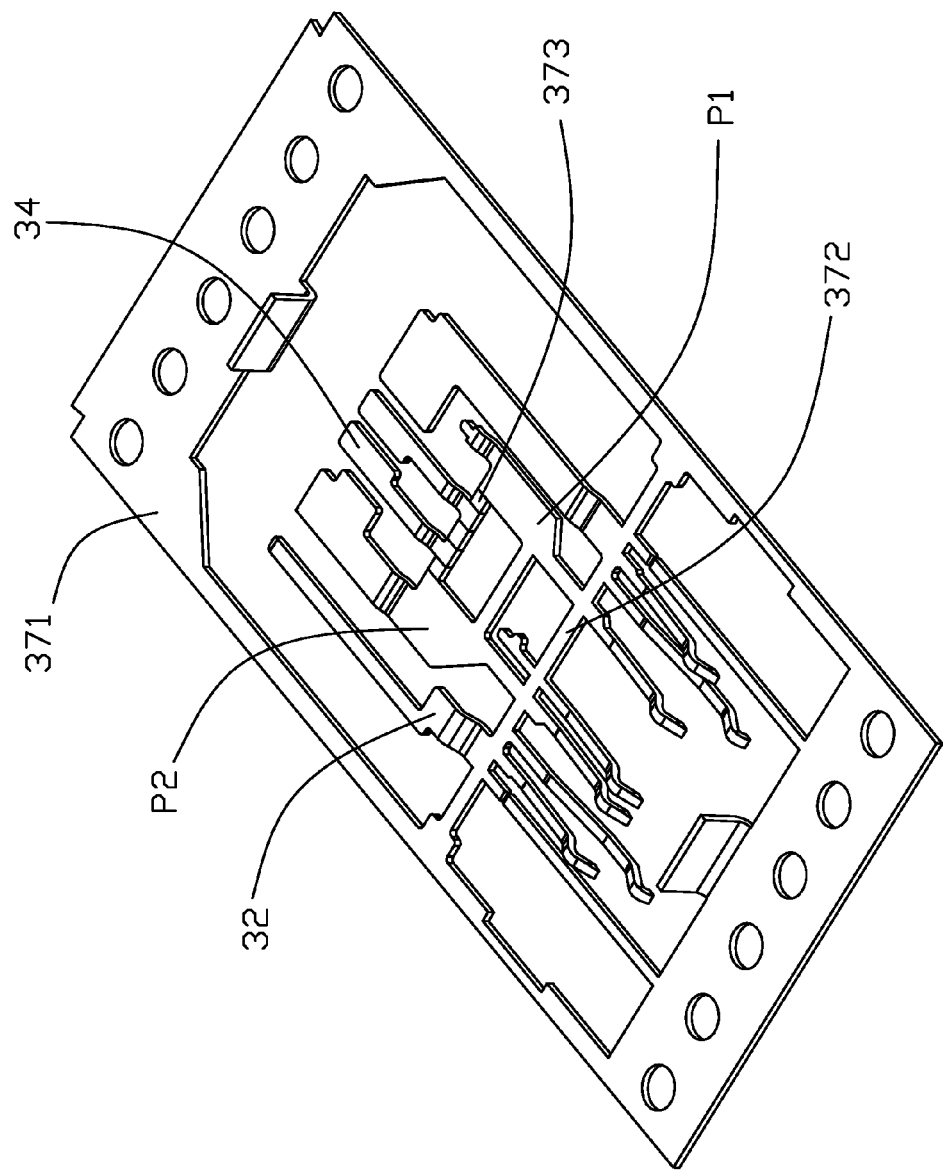
FIG. 13 is a perspective view of the lower terminals with a carrier, a first bridge and a second bridge.
Figure 14:
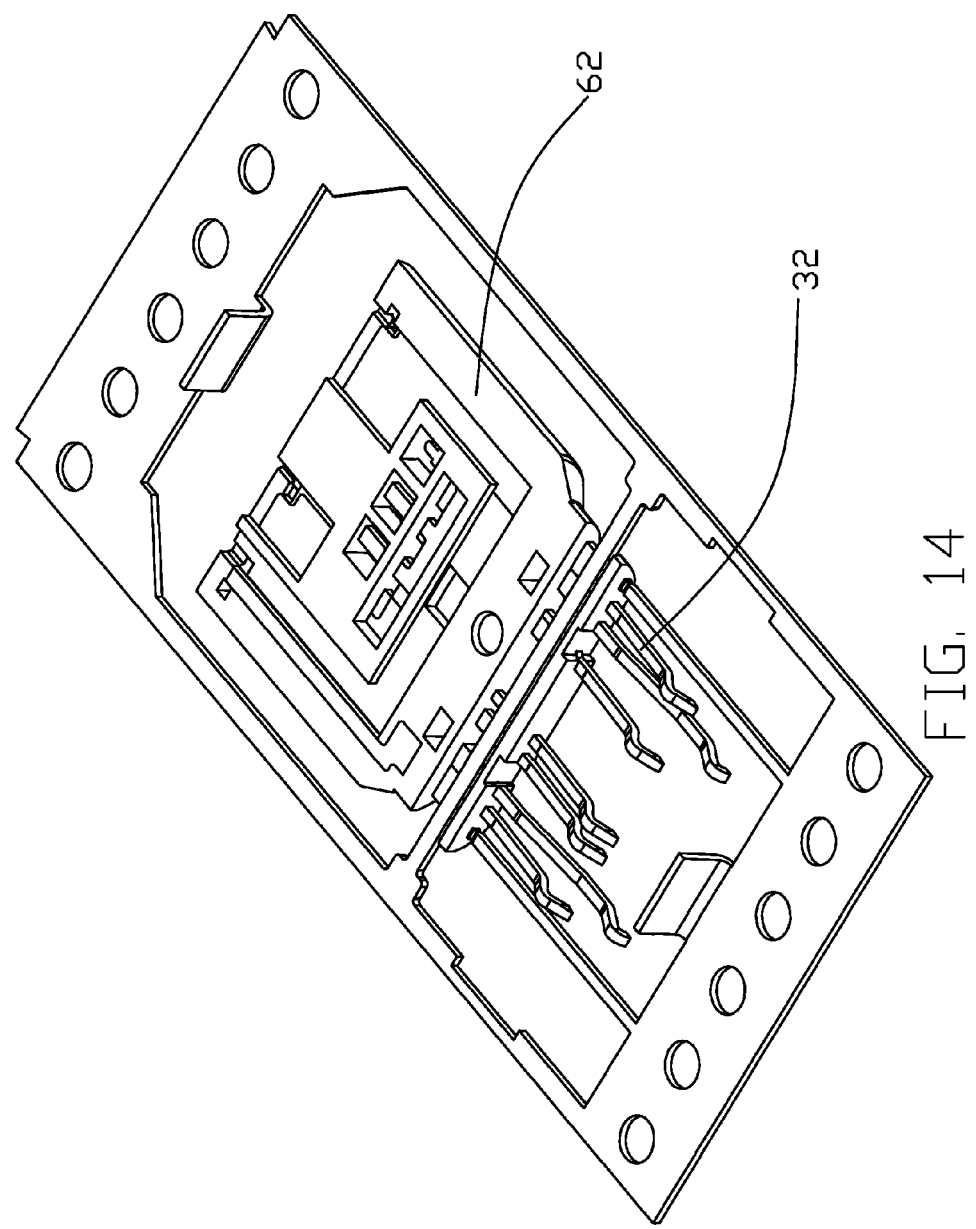
FIG. 14 is a perspective view of the lower terminals shown in FIG. 13 with a lower insulator insertion molded thereon.

Referring to FIGS. 13 and 14, a manufacturing process of the lower terminal module 60b is presented. The lower terminals 32 are connected together by a carrier 371 and a first bridge 372 is provided at the retaining portions 322 so as to joint the retaining portions 322 together, and further the two leg pieces 34 are connected together by a second bridge 373, which facilitates positioning the lower terminals 32 and the leg pieces 34 in an insertion molding process. After the insertion molding process is finished, the first bridge 372 is removed with a plurality of first slots 261 being formed, and the second bridge 373 is removed with said three second slots 262 being formed.

In the USB Type-C plug connector 100, the two contacting pieces 33 of the signal terminals D+, D− are disposed at the upper inside, while the soldering legs 342 of the signal terminals are disposed at the lower side, so that all the soldering legs which will be welded with the wires of the cable including the soldering legs 313G, 313C, 313P and the soldering legs 342 of the signal terminals functioning are configured commonly in the upper loading face 221, and the connecting legs 323G, 342, 323P needed to be connected with the cable 11 can be configured commonly in the lower loading face 222, which is inductive to improving and optimizing an arrangement of the ground legs 313G, 323G and the power legs 313P, 323P and maximizing their widths along the traverse direction. One key thing is that, if the signal terminals D+, D− are configured with soldering legs 34 integrally formed by bending and extending from the upper loading face 221 toward the lower loading face 222, it is difficult to manufacture especially for an electrical connector with two terminal modules such as said upper terminal module 60a and said lower terminal module 60b. In the preferred embodiment according to the present invention, each of the signal terminals D+, D− is formed by connecting the contacting piece 33 and the soldering piece 34 independent from each other, and the contacting piece 33 is disposed at the upper loading face 221 while the soldering piece 34 is disposed at the lower loading face 222, so that the independent soldering piece 34 wouldn't occupy the limited space of the upper loading face 221 contributing to widening the power/ground leg 313P/313G at the upper loading face 221 and simplifying a manufacturing process of the upper and lower terminal module 60a, 60b. In other embodiment, the detecting terminal CC, instead of the signal terminals D+, D−, can be defined as a special terminal, that is, the detecting leg of the detecting terminal CC is disposed at the lower loading face 222, with that the upper loading face 221 has a ground soldering leg 313G, a pair of signal soldering legs 342 and a power soldering leg 313P placed on it while the lower loading face 222 has a ground soldering leg 323G, a detecting soldering leg 313C and a power soldering leg 323P placed on it.

Figure 15:
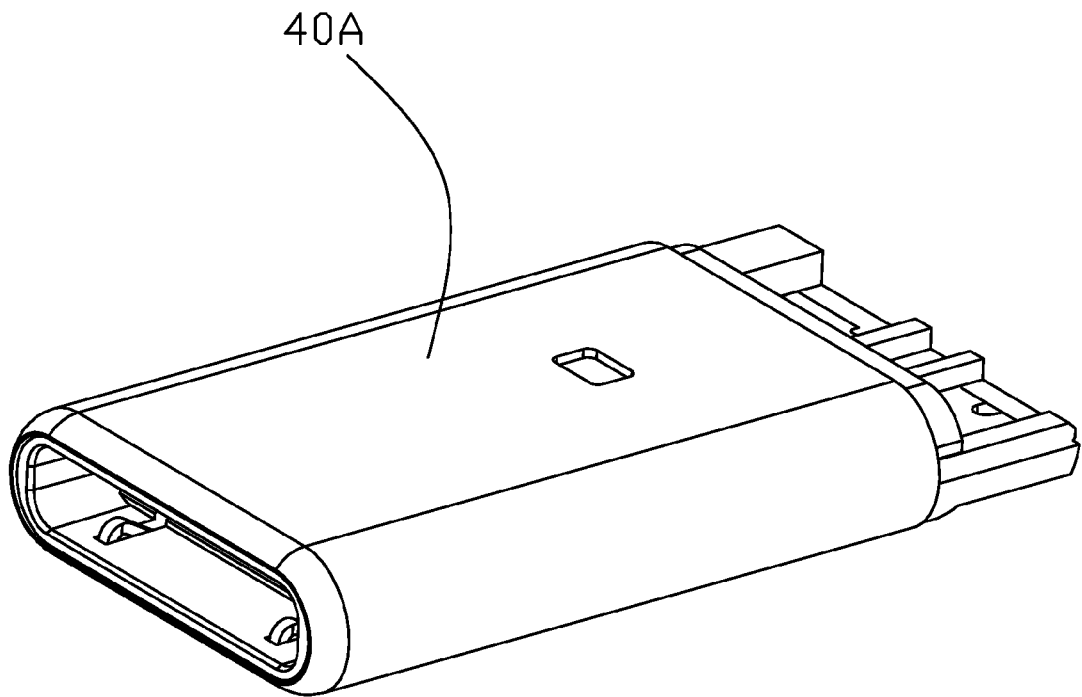
FIG. 15 is a perspective view of another plug head with an improved metallic shell which is different from FIG. 4.
Figure 16:
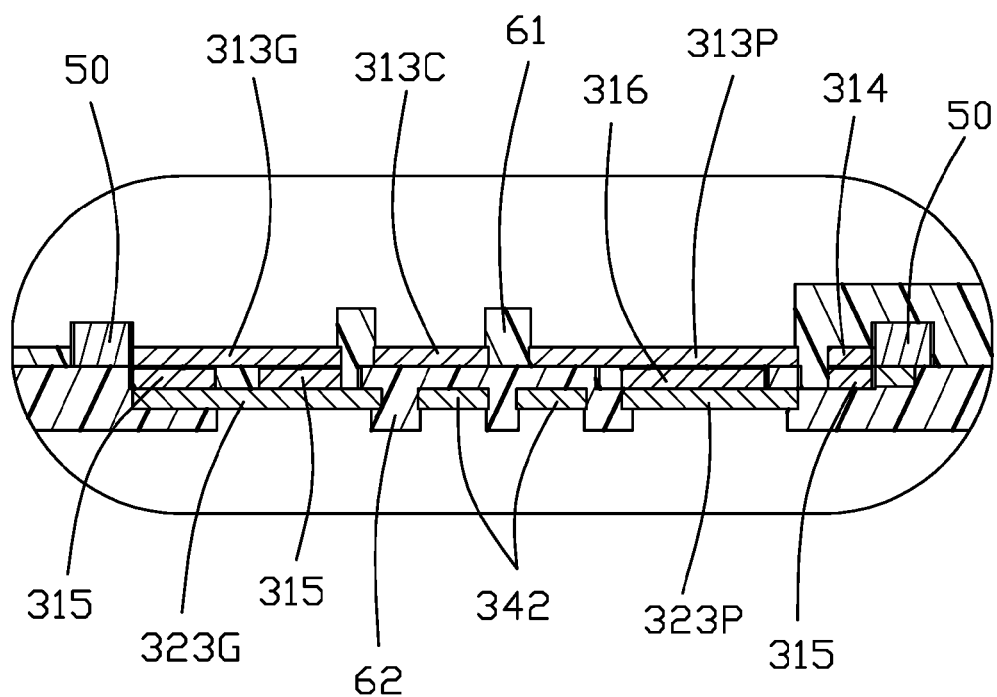
FIG. 16 is a cross-sectional view of the plug head of FIG. 4.
Figure 17:
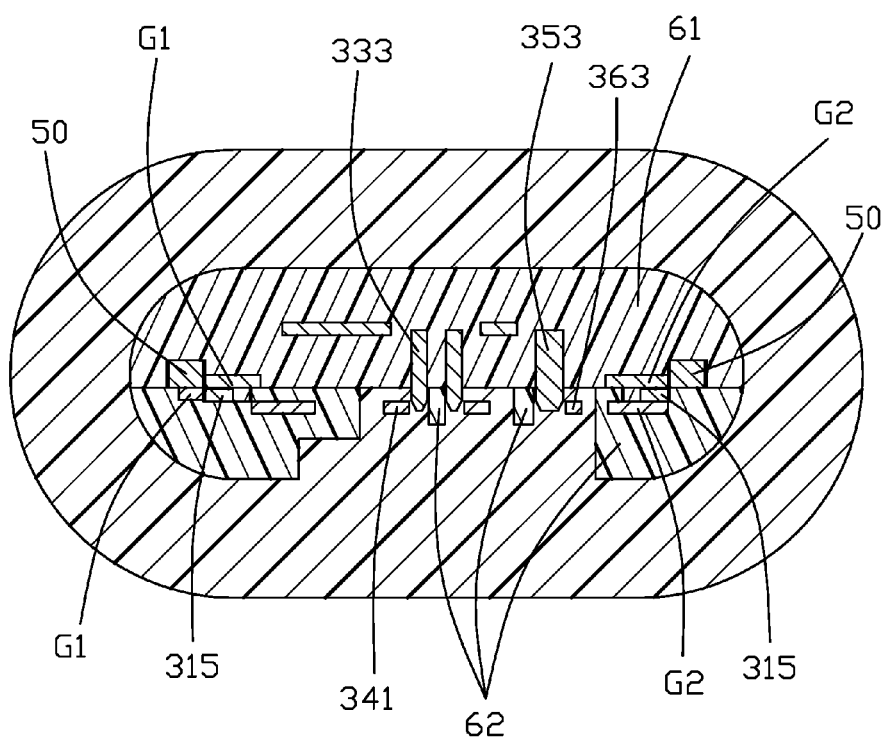
FIG. 17 is a cross-sectional view of the plug connector of FIG. 1.

Referring to FIG. 15, an improved metallic shell 40A extending in the elongate direction nearly until a rear end of the insulating body 20 and having an equal traverse width along said extending direction, different from the metallic shell 40 shown in FIG. 6, is disclosed. Therefore, the structural strength of the plug 10 is increased.

While a preferred embodiment in accordance with the present invention has been shown and described, equivalent modifications and changes known to persons skilled in the art according to the spirit of the present invention are considered within the scope of the present invention as described in the appended claims.

What is claimed is:
1. A plug connector, comprising:
an insulating body defining a mating cavity opening forwardly with an upper inside and a lower inside, a cable-load portion with an upper loading face and a lower loading face;
a row of upper terminals unitarily comprising contacting portions arranged along the upper inside of the mating cavity and connecting legs to the upper face of the cable-loading portion;
a row of lower terminals unitarily comprising contacting portions arranged along the lower inside of the mating cavity, and connecting legs extending to the lower face of the cable-loading portion; and
a special terminal;
wherein the special terminal comprises a contacting piece and a soldering piece discrete from each other, the contacting piece unitarily comprises a contacting portion located at the upper inside of the mating cavity and a first connecting portion, and the soldering piece unitarily comprises a soldering leg exposed upon the lower loading face of the cable-loading portion and a second connecting portion extending forward from the soldering leg, the first connecting portion and the second connecting portion electrically connect to each other so as to establish an electrical connection of the special terminal.

2. The plug connector as claimed in claim 1, wherein the second connecting portion is in a horizontal plane and the first connecting portion perpendicularly bend and directly touch the lower connecting portion.

3. The plug connector as claimed in claim 1, wherein the first connecting portion bend toward and space from the second connecting portion, the first and the second connecting portion electrically connect to each other via a soldering ball after a soldering process.

4. The plug connector as claimed in claim 1, comprising an upper terminal module and a lower terminal module, wherein the upper terminal module comprises an upper insulator retained with the row of upper terminals and the contacting piece of the special terminal, the lower terminal module comprises a lower insulator retained with the row of lower terminals and the soldering piece of the special terminal, the first connecting portion exposes to the upper insulator, the second connecting portion exposes to the lower insulator.

5. The plug connector as claimed in claim 1, wherein the lower insulator defines a slot to expose the second connecting portion of the soldering pieces.

6. A plug connector, comprising:
an insulating body defining a mating cavity opening forwardly with an upper inside and a lower inside, a cable-load portion with an upper loading face and a lower loading face;
a row of upper terminals comprising a first grounding terminal, a first power grounding terminal, a CC detecting terminal, a pair of signal terminals, a second power terminal and a second grounding terminal in series; and
a row of lower terminals comprising a first grounding terminal, a first power grounding terminal, a second power terminal and a second grounding terminal in series;
wherein each of the pair of the signal terminals comprises a contacting piece and a soldering piece discrete from the contacting piece, the contacting piece comprises a contacting portion in the upper inside of the mating cavity and a first connecting portion, the soldering piece comprises a soldering leg exposed upon the lower loading face of the cable-loading portion and a second connecting portion extending forward, the first and the second connecting portion electrically connect with each other.

7. The plug connector as claimed in claim 6, wherein the first power terminal of the upper terminals comprises a contacting portion in the upper inside of the mating cavity and a first connecting portion, the first power terminal of the lower terminals comprises a contacting portion in the lower inside of the mating cavity and a second connecting portion, the first and second contacting portion are electrically connecting with each other.

8. The plug connector as claimed in claim 7, wherein the CC detecting terminal and the second power terminal of the upper terminals each comprises a contacting portion in the upper inside of the mating cavity and a soldering leg exposed upon the upper face of the cable-loading portion, the first and second grounding terminals of the upper terminals commonly share a grounding soldering leg exposed upon the upper loading face; the first and second grounding terminals of the lower terminals comprises contacting portions in the lower inside of the mating cavity and commonly share a grounding soldering leg exposed upon the lower loading face, the second power terminal of the lower terminals comprises a contacting portion in the lower inside of the mating cavity and a soldering leg exposed upon the lower loading face of the cable-loading portion.

9. The plug connector as claimed in claim 8, wherein the first and the second power terminals of the lower terminals are unitarily connect with each other by a cross beam.

10. The plug connector as claimed in claim 6, comprising an upper terminal module and a lower terminal module, wherein the upper terminal module comprises an upper insulator retained with the row of upper terminals and the contacting pieces, the lower terminal module comprises a lower insulator retained with the row lower terminals and the soldering pieces, the first connecting portions expose to the upper insulator, the second connecting portions expose to the lower insulator.

11. The plug connector as claimed in claim 10, wherein the lower insulator defines slots to expose to the second connecting portions.

12. The plug connector as claimed in claim 7, wherein the soldering legs of the grounding terminal and the power terminal are wider than the soldering legs of the signal terminals in a traverse direction on the lower face, respectively.

13. The plug connector as claimed in claim 12, wherein the soldering legs of the ground terminal and power terminals on the upper loading face are larger than 2.0 mm in the traverse direction.

* * * * *